United States Patent
Zhang et al.

(10) Patent No.: US 9,967,733 B2
(45) Date of Patent: May 8, 2018

(54) METHOD, APPARATUS, AND SYSTEM FOR PROCESSING NETWORK SHARING

(71) Applicant: Huawei Technologies Co., Ltd., Shenzhen, Guangdong (CN)

(72) Inventors: Yanping Zhang, Shanghai (CN); Fenqin Zhu, Shanghai (CN); Yijun Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 174 days.

(21) Appl. No.: 14/542,363

(22) Filed: Nov. 14, 2014

(65) Prior Publication Data

US 2015/0072678 A1    Mar. 12, 2015

Related U.S. Application Data

(63) Continuation of application No. PCT/CN2012/075540, filed on May 15, 2012.

(51) Int. Cl.
*H04W 48/18* (2009.01)
*H04W 8/06* (2009.01)
(Continued)

(52) U.S. Cl.
CPC ......... *H04W 8/065* (2013.01); *H04W 48/18* (2013.01); *H04W 8/12* (2013.01); *H04W 8/24* (2013.01)

(58) Field of Classification Search
CPC ..... H04W 4/001; H04W 4/003; H04W 4/005; H04W 4/025; H04W 48/00; H04W 48/02; H04W 48/08; H04L 12/24
(Continued)

(56) References Cited

U.S. PATENT DOCUMENTS 8,160,976 B2 * 4/2012 Dwyer ............. H04W 36/0066
706/12
9,055,503 B2 * 6/2015 Lee ....................... H04W 36/30
(Continued)

FOREIGN PATENT DOCUMENTS

CN          1758615 A       4/2006
CN         101437219 A      5/2009
(Continued)

OTHER PUBLICATIONS

"3rd Generation Partnership Project; Technical Specification Group Core Network and Terminals; Mobility Management Entity (MME)-Visitor Location Register (VLR) SGs interface specification (Release 11)", 3GPP TS 29.118 v11.2.0, Mar. 2012, 63 pages.
(Continued)

*Primary Examiner* — Matthew C Sams

(57) ABSTRACT

Embodiments of the present invention disclose a method and an apparatus for sharing a core network, where the method includes: first, determining, by a mobility management network element, that a user equipment does not support network sharing; and then, sending, by the mobility management network element, a location update request message to a mobile switching center or visitor location register MSC/VLR, where the location update request message includes indication information that the user equipment does not support network sharing, or the location update request message includes a location area identity LAI including a common public land mobile network identifier common PLMN ID, or the location update request message includes an LAI including a common PLMN ID and includes a circuit switched domain public land mobile network identifier CS domain PLMN ID. The present invention is applicable to the field of communications systems.

15 Claims, 9 Drawing Sheets

(51) Int. Cl.
*H04W 8/12* (2009.01)
*H04W 8/24* (2009.01)

(58) Field of Classification Search
USPC ............ 455/433, 435.1, 406, 407, 404.2
See application file for complete search history.

(56) References Cited

U.S. PATENT DOCUMENTS

| | | | | |
|---|---|---|---|---|
| 9,198,124 B2* | 11/2015 | Dahlen | | H04W 48/18 |
| 9,467,908 B2* | 10/2016 | Jeong | | H04W 36/14 |
| 2005/0075129 A1* | 4/2005 | Kuchibhotla | | H04W 48/18 |
| | | | | 455/552.1 |
| 2006/0073831 A1* | 4/2006 | Guyot | | H04W 36/14 |
| | | | | 455/443 |
| 2010/0261473 A1 | 10/2010 | Al-Bakri et al. | | |
| 2010/0285797 A1* | 11/2010 | Ghai | | H04W 36/385 |
| | | | | 455/426.1 |
| 2011/0021216 A1* | 1/2011 | Pudney | | H04W 4/12 |
| | | | | 455/466 |
| 2011/0230188 A1* | 9/2011 | Gemski | | H04W 60/00 |
| | | | | 455/435.1 |
| 2012/0044866 A1* | 2/2012 | Lu | | H04L 12/5691 |
| | | | | 370/328 |
| 2012/0157100 A1* | 6/2012 | Suzuki | | H04W 48/18 |
| | | | | 455/435.2 |
| 2013/0044709 A1* | 2/2013 | Adjakple | | H04W 76/025 |
| | | | | 370/329 |
| 2013/0051362 A1* | 2/2013 | Lee | | H04W 36/30 |
| | | | | 370/331 |
| 2013/0100932 A1* | 4/2013 | Yu | | H04W 48/18 |
| | | | | 370/331 |
| 2013/0163560 A1* | 6/2013 | Diachina | | H04W 36/0022 |
| | | | | 370/331 |
| 2013/0178208 A1* | 7/2013 | Dahlen | | H04W 48/18 |
| | | | | 455/435.2 |
| 2013/0237225 A1* | 9/2013 | Martin | | H04W 36/0055 |
| | | | | 455/436 |
| 2013/0265954 A1* | 10/2013 | Dahlen | | H04W 48/18 |
| | | | | 370/329 |
| 2013/0303114 A1* | 11/2013 | Ahmad | | H04W 4/26 |
| | | | | 455/406 |
| 2014/0045499 A1* | 2/2014 | Johansson | | H04W 36/0083 |
| | | | | 455/436 |
| 2014/0051443 A1* | 2/2014 | Diachina | | H04W 36/0022 |
| | | | | 455/436 |
| 2014/0135000 A1* | 5/2014 | Shu | | H04W 48/12 |
| | | | | 455/433 |
| 2015/0072678 A1* | 3/2015 | Zhang | | H04W 8/065 |
| | | | | 455/433 |
| 2015/0172965 A1* | 6/2015 | Jeong | | H04W 36/14 |
| | | | | 370/331 |

FOREIGN PATENT DOCUMENTS

| | | | | |
|---|---|---|---|---|
| CN | 101674628 A | | 3/2010 | |
| WO | WO 2007098711 A1 * | | 9/2007 | ............ H04W 8/04 |
| WO | WO 2012/022029 A1 | | 2/2012 | |
| WO | WO 2013/057536 A1 * | | 4/2013 | ............ H04W 48/08 |
| WO | WO 2013057536 A1 * | | 4/2013 | ............ H04W 48/10 |

OTHER PUBLICATIONS

"3rd Generation Partnership Project; Technical Specification Group Services and System Aspects; Circuit Switched (CS) fallback in Evolved Packet System (EPS); Stage 2 (Release 11)", 3GPP TS 23.272 v11.0.0, Mar. 2012, 87 pages.

3rd Generation Partnership Project; Technical Specification Group Services and System Aspects; Network Sharing; Architecture and functional description (Release 11); 3GPP TS 23.251 V11.1.0, Mar. 2012, 28 pages.

"Introduction of GERAN network sharing capability", TeliaSonera, 3GPP TSG-CT WG1 Meeting #77, Apr. 16-20, 2012, 5 pages.

* cited by examiner

METHOD, APPARATUS, AND SYSTEM FOR PROCESSING NETWORK SHARING

CROSS-REFERENCE TO RELATED APPLICATIONS

This application is a continuation of International Application No. PCT/CN2012/075540, filed on May 15, 2012, which is hereby incorporated by reference in its entirety.

TECHNICAL FIELD

The present invention relates to the field of communications systems, and in particular, to a method, an apparatus, and a system for processing network sharing.

BACKGROUND

In order to reduce operating costs, more and more operators choose to build a network together or rent a network of another operator. That feature is called GWCN (Gateway Core Network) in the 3GPP (3rd generation partnership project) standard. In an existing network, a user equipment may access an MSC (Mobile Switching Center)/VLR (Visitor Location Register) through a mobility management network element. Under the feature of the GWCN, the MSC/VLR serves multiple user equipments according to a circuit switched domain CS domain PLMN (public land mobile network) ID. In this case, the mobility management network element selects a CS domain PLMNID, and includes the selected CS domain PLMN ID in an LAI (location area identity) and sends the LAI to the MSC/VLR. The MSC/VLR stores the CS domain PLMN ID selected by the mobility management network element.

Currently, in a gateway core network (GWCN) or a multi-operator core network (MOCN), a mobility management network element sends, to an MSC/VLR, an LAI of a user equipment located, and after receiving the LAI sent by the mobility management network element, the MSC/VLR reads a PLMN ID in the LAI as a CS domain PLMN ID. Further, the MSC/VLR always stores the LAI sent by the mobility management network element, and allocates a TMSI to a user according to the LAI. The TMSI is unique within the LAI. The MSC/VLR further includes the LAI sent by the mobility management network element in a location update accept message and sends the location update accept message to the mobility management network element. In the prior art, an LAI sent by a mobility management network element to an MSC/VLR always includes an LAI including a CS domain PLMN ID. The CS domain PLMN ID may be used by the MSC/VLR in some non-specific processes. For example, a charging bill includes a CS domain PLMN ID which is reported to a billing center, or an information of the CS domain PLMN ID is provided during interaction with an HSS/HLR, so that the MSC/VLR obtains user subscription data related to the CS domain PLMN ID, and serves a user equipment according to the user subscription data. However, when the user equipment does not support network sharing, a location area identity LAI including a common public land mobile network identifier common PLMN ID is sent by the mobility management network element to the user equipment. The common PLMN ID is not equivalent to a CS domain PLMN ID, so that when the user equipment not supporting network sharing needs to access an MSC/VLR, it is caused that a message sent by the user equipment to the MSC/VLR is inconsistent with an LAI locally stored by the MSC/VLR, and therefore, the MSC/VLR determines to interact with an HSS (Home Subscriber Server) again to obtain data of the user equipment, and may perform re-authorization and authentication on the user equipment, which increases a time delay, and meanwhile, incurs unnecessary signaling, thereby causing a great waste of network resources.

SUMMARY

Embodiments of the present invention provide a method, an apparatus, and a system for processing network sharing, so as to solve a problem that when a user equipment accesses a network, a message sent by the user equipment to an MSC/VLR is inconsistent with a message locally stored by the MSC/VLR, and therefore, the MSC/VLR performs re-authorization on the user equipment, which increases a time delay, and meanwhile, incurs unnecessary signaling, thereby causing a waste of network resources.

The embodiments of the present invention adopt the following technical solutions:

A method for processing network sharing includes:
determining, by a mobility management network element, that a user equipment does not support network sharing; and
sending, by the mobility management network element, a location update request message to a mobile switching center or visitor location register MSC/VLR, where the location update request message includes indication information that the user equipment does not support network sharing, or the location update request message includes a location area identity LAI including a common public land mobile network identifier common PLMN ID, or the location update request message includes an LAI including a common PLMN ID and includes a circuit switched domain public land mobile network identifier CS domain PLMN ID selected by the mobility management network element.

A method for processing network sharing includes:
receiving, by a mobile switching center or visitor location register MSC/VLR, a location update request message sent by a mobility management network element, where the location update request message includes a first information element, and the first information element is a location area identity LAI; and
selecting, by the MSC/VLR, a circuit switched domain public land mobile network identifier according to whether the location update request message includes a second information element, where the second information element is a second circuit switched domain public land mobile network identifier; where the selecting, by the MSC/VLR, a circuit switched domain public land mobile network identifier according to whether the location update request message comprises a second information element comprises:
determining, by the MSC/VLR, that the location update request message comprises the second information element, and selecting, by the MSC/VL, a circuit switched domain public land mobile network identifier which is the same as the second circuit switched domain public land mobile network identifier, wherein the first information element comprises a common public land mobile network identifier common PLMN ID.

A method for processing network sharing includes:
receiving, by a mobile switching center or visitor location register MSC/VLR, a location update request message sent by a mobility management network element, where the location update request message includes indication information that a user equipment does not support network sharing; and according to the indication information, storing, by the MSC/VLR, a location area identity LAI including a first common public land mobile network identifier common PLMN ID.

A mobility management network element apparatus includes:

a determining unit, and at least one sending unit of a first sending unit, a second sending unit, and a third sending unit, where the determining unit is configured to determine that a user equipment does not support network sharing;

the first sending unit is configured to send a location update request message to a mobile switching center or visitor location register MSC/VLR, where the location update request message includes indication information that the user equipment does not support network sharing;

the second sending unit is configured to send a location update request message to the mobile switching center or visitor location register MSC/VLR, where the location update request message includes a location area identity LAI including a common public land mobile network identifier common PLMN ID; and the third sending unit is configured to send a location update request message to the mobile switching center or visitor location register MSC/VLR, where the location update request message includes an LAI including a common PLMN ID and includes a circuit switched domain public land mobile network identifier CS domain PLMN ID.

A mobile switching center or visitor location register apparatus includes:

a receiving unit, configured to receive a location update request message sent by a mobility management network element, where the location update request message includes a first information element, and the first information element is an LAI; and a selecting unit, configured to select a circuit switched domain public land mobile network identifier according to whether the location update request message includes a second information element, where the second information element is a second circuit switched domain public land mobile network identifier, where the selecting unit is specifically configured to determine that the location update request message comprises the second information element, and select a circuit switched domain public land mobile network identifier which is the same as the second circuit switched domain public land mobile network identifier, wherein the first information element comprises a common public land mobile network identifier common PLMN ID.

A mobile switching center or visitor location register apparatus includes:

a receiving unit, configured to receive a location update request message sent by a mobility management network element, where the location update request message includes indication information that a user equipment does not support network sharing; and a storing unit, configured to store, according to the indication information, a location area identity LAI including a first common public land mobile network identifier common PLMN ID.

A system for transmitting network information includes the mobility management network element apparatus and the mobile switching center or visitor location register apparatus.

In the method, the apparatus, and the system for processing network sharing provided by the embodiments of the present invention, first, a mobility management network element determines that a user equipment does not support network sharing; then, the mobility management network element sends a location update request message to a mobile switching center or visitor location register MSC/VLR, where the location update request message includes indication information that the user equipment does not support network sharing, or the location update request message includes a location area identity LAI including a common public land mobile network identifier common PLMN ID, or the location update request message includes an LAI including a common PLMN ID and includes a circuit switched domain public land mobile network identifier CS domain PLMN ID. In the prior art, when a user equipment not supporting network sharing accesses an MSC/VLR, it is caused that a message sent by the user equipment to the MSC/VLR is inconsistent with an LAI locally stored by the MSC/VLR, and therefore, the MSC/VLR determines to interact with an HSS again to obtain data of the user equipment, and may perform re-authorization and authentication on the user equipment, which increases a time delay, and meanwhile, incurs unnecessary signaling, thereby causing a great waste of network resources. In the method and the apparatus provided by the embodiments of the present invention, it is implemented that a user equipment normally accesses an MSC/VLR, and meanwhile, a problem that when the user equipment accesses a network, an LAI sent by the user equipment to the MSC/VLR is inconsistent with an LAI locally stored by the MSC/VLR, and therefore, the MSC/VLR performs re-authorization on the user equipment, which increases a time delay, and meanwhile, incurs unnecessary signaling, thereby causing a great waste of network resources is solved.

BRIEF DESCRIPTION OF THE DRAWINGS

To make the technical solutions in the embodiments of the present invention clearer, accompanying drawings for describing the embodiments or the prior art are briefly introduced in the following. Apparently, the accompanying drawings in the following description are only some embodiments of the present invention, and persons of ordinary skill in the art may further derive other drawings according to these accompanying drawings without creative efforts.

DETAILED DESCRIPTION

The technical solutions in the embodiments of the present invention are clearly described in the following with reference to the accompanying drawings in the embodiments of the present invention. Obviously, the embodiments to be described are only a part rather than all of the embodiments of the present invention. All other embodiments obtained by persons of ordinary skill in the art based on the embodiments of the present invention without creative efforts shall fall within the protection scope of the present invention.

In order to make the advantages of the technical solutions of the present invention more comprehensible, the present invention is described in detail in the following with reference to the accompanying drawings and the embodiments.

In all embodiments, network sharing may be sharing of an MOCN (Multi-Operator Core Network), or sharing of a GWCN, or network sharing of a hybrid network not only including an MOCN but also including a GWCN.

In all embodiments of the present invention, a CS domain PLMN ID may be a serving CS domain PLMN ID (serving CS domain PLMN ID), or a PLMN ID selected by a mobility management network element for a CS domain (selected PLMN ID for CS Domain), or an operator identifier of a serving core network, which is not limited in the embodiments of the present invention.

In all embodiments of the present invention, a mobility management network element may be an SGSN (Serving GPRS Support Node), or may be an MME (Mobility Management Entity).

Figure 1:
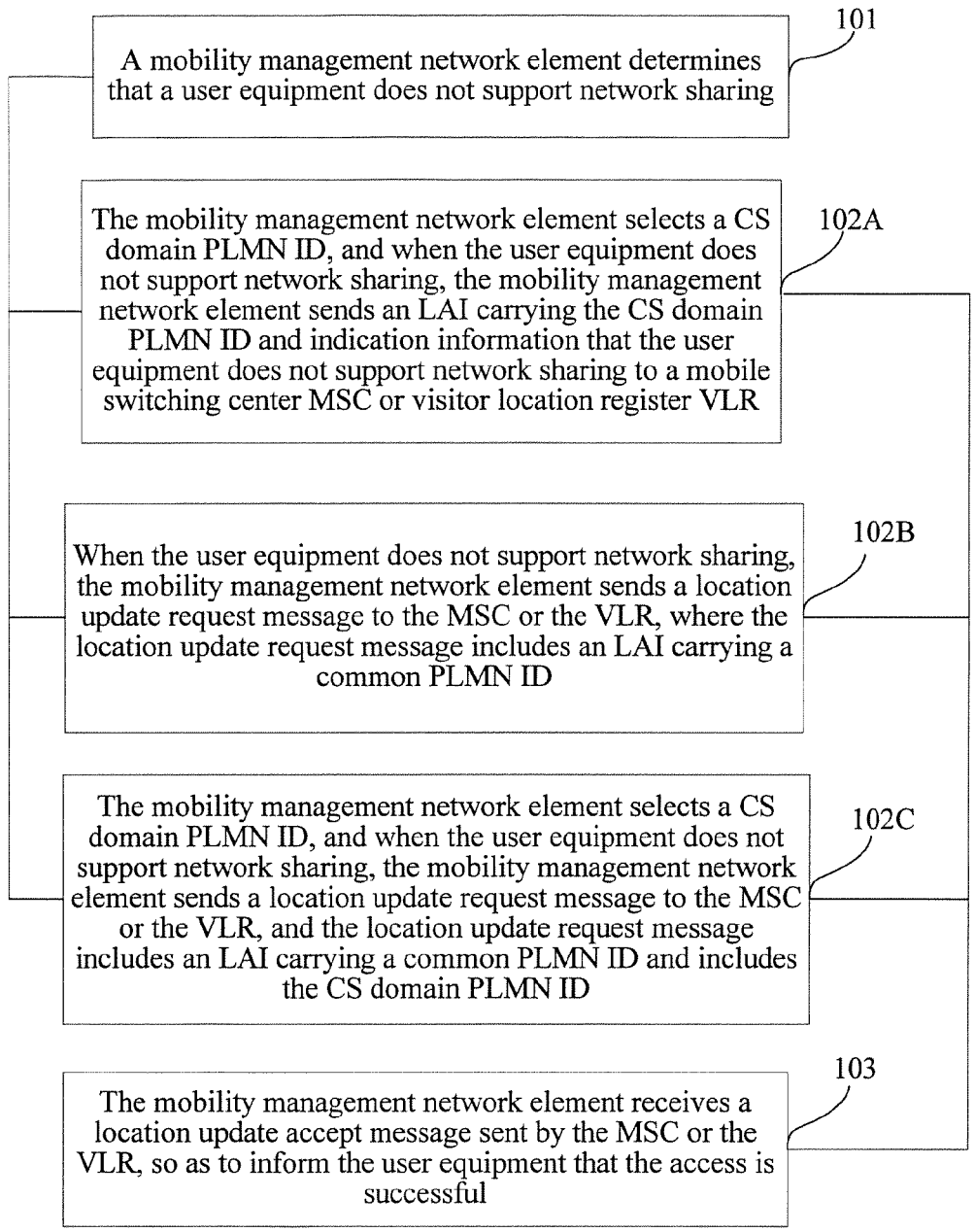
FIG. 1 is a flow chart of a method for processing network sharing according to an embodiment of the present invention.

An embodiment provides a method for processing network sharing, and as shown in FIG. 1, the method includes:

101: A mobility management network element determines that a user equipment does not support network sharing.

Specifically, the mobility management network element may receive an access request message sent by the user equipment. The access request message includes capability information indicating whether the user equipment supports network sharing.

The access request message may be a combined attach request/combined TAU request (combined attach request or combined tracking area update request) message. The capability information on whether the user equipment supports network sharing may be a capability of whether the user equipment supports GEEARN network sharing and/or a capability of whether the user equipment supports UTRAN network sharing. The capability of whether the user equipment supports network sharing may be included in a radio access capability of the user equipment, or may be included in a network capability of the user equipment, which is not limited in the embodiment of the present invention.

Alternatively, the mobility management network element may also receive capability information sent by an access network element corresponding to the user equipment indicating whether the user equipment supports network sharing.

Alternatively, the mobility management network element may also obtain user equipment information from an old mobility management network element, and the user equipment information may include capability information indicating whether the user equipment supports network sharing. After receiving an access request of the user equipment, the mobility management network element may find, according to a parameter included in the access request, for example, an old TAI (tracking area identifier), the old mobility management network element, and obtain the user equipment information. In this embodiment, the old mobility management network element may be an SGSN (Serving GPRS Support Node), and may also be an MME (Mobility Management Entity).

Specifically, the determining, by the mobility management network element, that the user equipment does not support network sharing may be:

determining, by the mobility management network element, according to the capability information indicating whether the user equipment supports network sharing, that the user equipment does not support network sharing of a target radio access technology RAT preferably selected by circuit service fallback CSFB; or determining, by the mobility management network element, according to the capability information indicating whether the user equipment supports network sharing, that the user equipment does not support network sharing of an RAT preferably selected by a circuit switched domain CS domain.

The target RAT preferably selected by the CSFB or the RAT preferably selected by the CS domain may be deployed on the mobility management network element by an operator. Information on whether the target RAT preferably selected by the CSFB supports network sharing or information on whether the RAT preferably selected by the CS domain supports network sharing may be deployed on the mobility management network element by the operator.

Specifically, the determining, by the mobility management network element, according to the capability information indicating whether the user equipment supports network sharing, that the user equipment does not support network sharing of the target radio access technology RAT preferably selected by circuit service fallback CSFB may be:

determining, by the mobility management network element, that the user equipment does not support network sharing of a GSM EDGE radio access network GERAN, where the target RAT is the GERAN, and the GERAN network supports network sharing; or determining, by the mobility management network element, that the user equipment does not support network sharing of a universal mobile telecommunications system terrestrial radio access network UTRAN, where the target RAT is the UTRAN, and the UTRAN network supports network sharing.

Specifically, the determining, by the mobility management network element, that the user equipment does not support network sharing of the RAT preferably selected by the circuit switched domain CS domain may be:

determining, by the mobility management network element, that the user equipment does not support network sharing of a GERAN, where the RAT is the GERAN, and the GERAN network supports network sharing; or determining, by the mobility management network element, that the user equipment does not support network sharing of a UTRAN, where the RAT is the UTRAN, and the UTRAN network supports network sharing.

102: The mobility management network element sends a location update request message to a mobile switching center or visitor location register MSC/VLR. The location update request message includes indication information that the user equipment does not support network sharing, or the location update request message includes a location area identity LAI including a common public land mobile network identifier common PLMN ID, or the location update request message includes an LAI including a common PLMN ID and includes a circuit switched domain public land mobile network identifier CS domain PLMN ID.

In an embodiment, as shown by 102A, after the mobility management network element selects the CS domain PLMN ID, and when the mobility management network element determines that the user equipment does not support network sharing, the mobility management network element may send a location update request message including the indication information that the user equipment does not support network sharing to the mobile switching center or visitor location register MSC/VLR. For example, the common PLMN ID may be used as the indication information.

Optionally, the location update request message may further include the LAI including the CS domain PLMN ID. The CS domain PLMN ID is the CS domain PLMN ID selected by the mobility management network element.

Manners in which the mobility management network element selects the CS domain PLMN ID may include, but are not limited to, the following manners:

For example, the CS domain PLMN ID may be selected according to a TAI (tracking area identity) of the user equipment currently located, or according to an original LAI (old LAI), or according to a preferred CS domain RAT (radio access technology) of the user equipment.

For example, the mobility management network element may also obtain the user equipment info/nation from the old mobility management network element, and the user equipment information may include the CS domain PLMN ID. The mobility management network element may select the CS domain PLMN ID from the user equipment information. After receiving an access request of the user equipment, the mobility management network element may find, according to a parameter included in the access request, for example, an old TAI (tracking area identifier), the old mobility management network element, and obtain the user equipment information. In the present invention, the old mobility management network element may be an SGSN Serving GPRS Support Node), and may also be an MME (Mobility Management Entity).

For example, the mobility management network element may also obtain it from an LAI including the selected CS domain PLMN ID stored by the mobility management network element.

Through the method of this embodiment, the mobility management network element may notify the MSC/VLR that the user equipment does not support network sharing. Therefore, the MSC/VLR may construct an LAI including a common PLMN ID according to the indication, and allocate a TMSI for a user according to the LAI. That is, a correct LAI may be stored, and meanwhile, the MSC/VLR may use a correct CS domain PLMN ID to provide a service for the user equipment. For example, the MSC/VLR serves the user according to a policy of the CS domain PLMN ID, and includes the CS domain PLMN ID in a charging bill. In the embodiment of the present invention, the CS domain PLMN ID included in the LAI may be a serving CS domain PLMN ID or may be a selected selected CS domain PLMN ID, which are different in name but are both CS domain PLMN IDs, which is not limited in this embodiment.

In another embodiment, as shown by 102B, when the mobility management network element determines that the user equipment does not support network sharing, the mobility management network element may send a location update request message to the MSC/VLR, and the location update request message includes the LAI including the common PLMN ID. In this manner, the mobility management network element may indicate, by including the Common PLMN ID in the LAI, to the MSC/VLR that the user equipment does not support network sharing. Therefore, the MSC or the VLR may select a CS domain PLMN ID from a preset PLMN list according to an operator policy or preset user subscription data to serve the user. When the user equipment supports network sharing, the mobility management network element may select the CS domain PLMN ID, and send an LAI including the CS domain PLMN ID to the MSC/VLR, and in this case, the LAI does not include the common PLMN ID.

Through the method of the embodiment, the MSC/VLR stores the LAI sent by the mobility management network element, and allocates the TMSI according to the LAI. Particularly, when the MSC/VLR determines that the PLMN ID included in the LAI is the common PLMN ID, the MSC/VLR selects the CS domain PLMN ID and sends it to the mobility management network element. It is ensured that the correct CS domain PLMN ID is used to serve the user. A problem caused by LAI inconsistency between the user equipment and the MSC/VLR is solved.

In another embodiment, as shown by 102C, after the mobility management network element selects the CS domain PLMN ID, and when the mobility management network element determines that the user equipment does not support network sharing, the mobility management network element sends a location update request message to the MSC/VLR, and the location update request message includes a first information element LAI and a second information element CS domain PLMN ID. In this case, the first information element LAI includes the common PLMN ID. The CS domain PLMN ID is another information element different from an LAI information element, and includes, but is not limited to: The CS domain PLMN ID is included in a cell identifier (cell ID) and sent to the MSC/VLR. If the user equipment supports network sharing, the location update request message includes the first information element LAI, and in this case, the LAI includes the CS domain PLMN ID. Therefore, after receiving an LAI sent by the mobility management network element, the MSC/VLR stores the LAI and allocates a TMSI. Meanwhile, the MSC/VLR selects a correct CS domain PLMN ID according to whether a second information element exists, to serve the user equipment.

In 102C, manners in which the mobility management network element selects the CS domain PLMN ID are the same as the manners in the foregoing embodiment of 102A.

Through the method of this embodiment, the MSC/VLR stores the LAI sent by the mobility management network element, and allocates the TMSI according to the LAI. The LAI sent by the mobility management network element to the MSC/VLR is also the LAI sent to the user equipment, so as to solve the problem caused by LAI inconsistency between the user equipment and the MSC/VLR. Meanwhile, the MSC/VLR selects the CS domain PLMN ID according to whether the second information element exists, so that it is still ensured that the correct CS domain PLMN ID is used.

103: The mobility management network element receives a location update accept message sent by the MSC/VLR, so as to inform the user equipment that the access is successful. For the embodiment of the present invention, 103 is an optional step.

The location update accept message includes the LAI including the common PLMN ID (corresponding to step 102A/102C) or the CS domain PLMN ID selected by the MSC/VLR (corresponding to step 102B).

Optionally, after step 103, the method may further include: sending, by the mobility management network element, the LAI including the common PLMN ID to the user equipment not supporting network sharing, and sending the LAI including the CS domain PLMN ID to the user equipment supporting network sharing. After the mobility management network element receives the location update accept message, the mobility management network element sends the LAI including the CS domain PLMN ID to an access network element corresponding to the user equipment specifically by using, but not limited to by using, an initial context setup message. Other steps may further exist between the receiving, by the mobility management network element, the location update accept message and the sending the CS domain PLMN ID to the access network element, which is not limited in the present invention.

Figure 2:
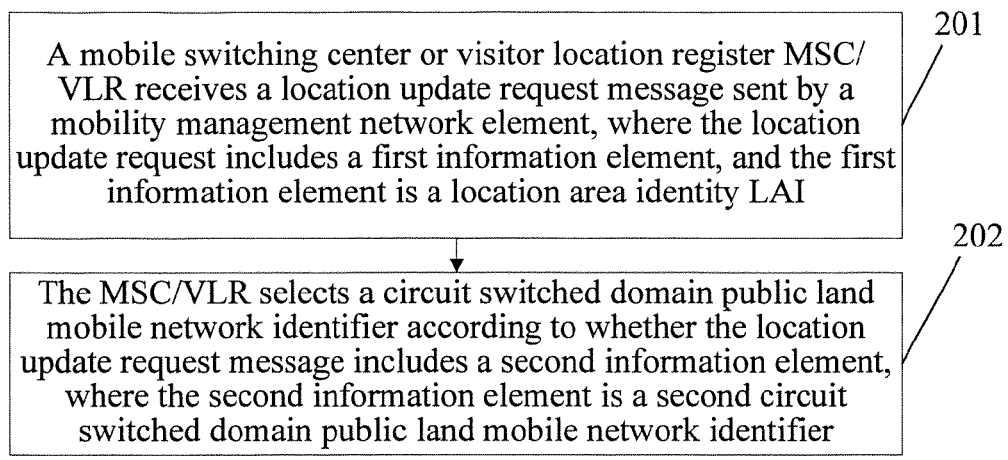
FIG. 2 is a flow chart of another method for processing network sharing according to an embodiment of the present invention.

An embodiment provides a method for processing network sharing, and as shown in FIG. 2, the method includes:

201: A mobile switching center or visitor location register MSC/VLR receives a location update request message sent by a mobility management network element, where the location update request message includes a first information element, and the first information element is a location area identity LAI.

202: The MSC/VLR selects a circuit switched domain public land mobile network identifier according to whether the location update request message includes a second information element, where the second information element is a second circuit switched domain public land mobile network identifier.

In step 202, the location update request message may include the second CS domain PLMN ID, and the second CS domain PLMN ID is another information element different from an LAI information element. The second information element may be included in a cell identifier cell ID for transmission. The location update request message may not include the second information element CS domain PLMN ID.

Specifically, the MSC/VLR determines that the location update request message includes the second information element, the MSC/VL selects a circuit switched domain public land mobile network identifier which is the same as the second circuit switched domain public land mobile network identifier, and the first information element includes a common public land mobile network identifier common PLMN ID. Further, if the location update request message includes the cell identifier, the MSC/VLR obtains a PLMN ID in the cell identifier, and stores the PLMN ID as the CS domain PLMN ID.

Specifically, the MSC/VLR determines that the location update request message does not include the second information element, the MSC/VLR selects the circuit switched domain public land mobile network identifier as the first circuit switched domain public land mobile network identifier included in the first information element.

The selected CS domain PLMN ID may be used in some non-specific processes. For example, a charging bill includes the CS domain PLMN ID which is reported to a billing center, or information of the CS domain PLMN ID is provided during interaction with an HSS/HLR, so that the MSC/VLR obtains user subscription data related to the CS domain PLMN ID, and serves a user equipment according to the user subscription data.

Through the method of this embodiment, the MSC/VLR stores the LAI sent by the mobility management network element, and allocates a TMSI according to the LAI. The LAI sent by the mobility management network element to the MSC/VLR is also an LAI sent to a user equipment, so as to solve a problem caused by LAI inconsistency between the user equipment and the MSC/VLR. Further, the MSC/VLR selects the CS domain PLMN ID according to whether the second information element exists, so that it is still ensured that the correct CS domain PLMN ID is used.

Figure 3:
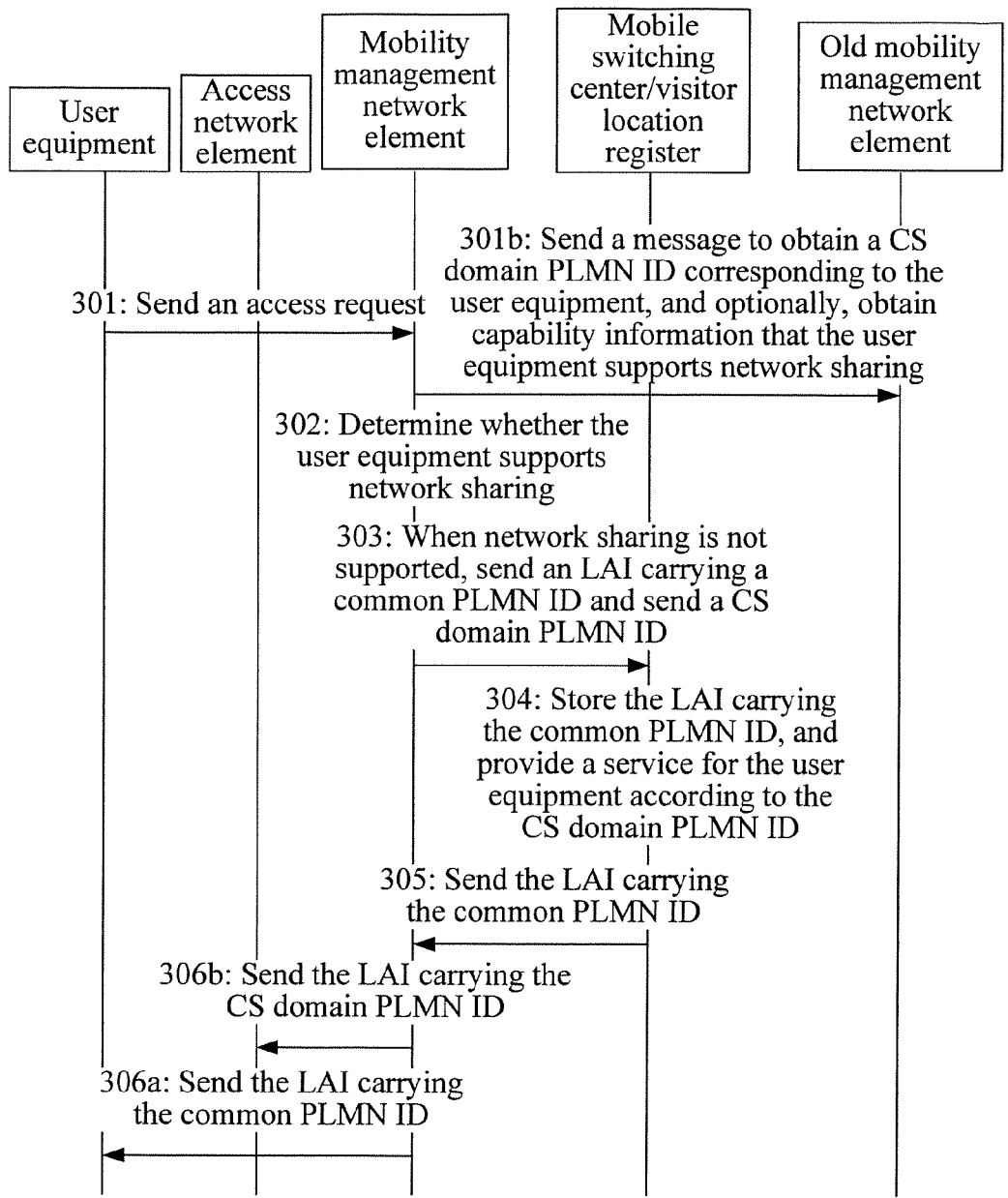
FIG. 3 is a schematic flow chart of a method for processing network sharing according to an embodiment of the present invention.

For a method for processing network sharing provided by an embodiment of the present invention, a specific application process may, as shown in FIG. 3, include:

301: A user equipment sends an access request message to a mobility management network element.

Optionally, 301b: When the mobility management network element needs to select, according to a CS domain PLMN ID of the user equipment located previously, a CS domain PLMN ID currently serving the user equipment, that is, when a user access request is processed, a current mobility management network element sends a message to an old mobility management network element to obtain a CS domain PLMN ID corresponding to the user equipment. Optionally, capability information on whether the user equipment supports network sharing may also be obtained from the old mobility management network element.

302: The mobility management network element determines whether the user equipment supports network sharing.

303: When the user equipment does not support network sharing, the mobility management network element sends a location update request message to an MSC or a VLR, where the location update request message includes an LAI carrying a common PLMN ID and includes a CS domain PLMN ID.

304: The MSC or the VLR stores the LAI carrying the common PLMN ID, and selects the CS domain PLMN ID as the CS domain PLMN ID included in the message.

305: The MSC or the VLR sends a location update accept message to the mobility management network element, where the message includes the LAI carrying the common PLMN ID.

306a: The mobility management network element sends an access accept message to the user equipment, where the message includes the LAI carrying the common PLMN ID.

306b: The mobility management network element sends the LAI carrying the CS domain PLMN ID to an access network element corresponding to the user equipment.

Figure 4:
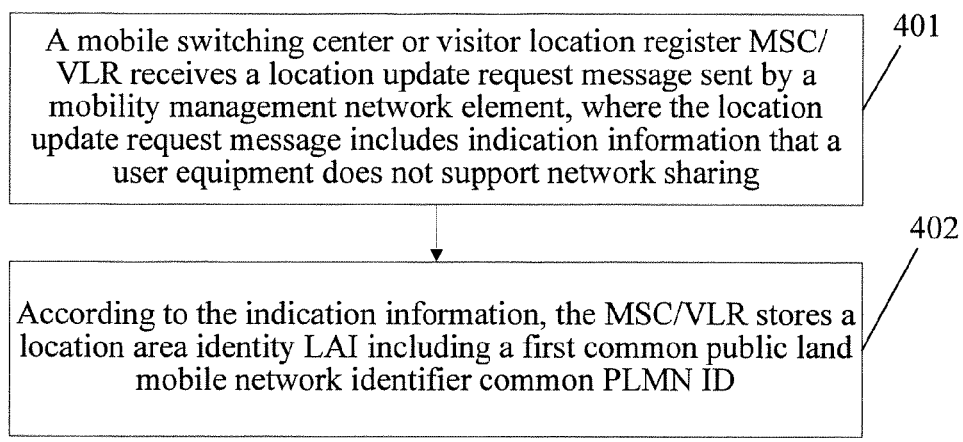
FIG. 4 is a schematic flow chart of another method for processing network sharing according to an embodiment of the present invention.

An embodiment provides a method for processing network sharing, and as shown in FIG. 4, the method includes:

401: A mobile switching center or visitor location register MSC/VLR receives a location update request message sent by a mobility management network element, where the location update request message includes indication information that a user equipment does not support network sharing.

Specifically, indication information on whether the user equipment supports network sharing may be indicated through an information element with a specific value. For example, a name of the information element is, for example, sharing supporting flag, a value being 1 indicates supporting, and a value being 0 indicates not supporting. This embodiment does not limit a specific value of the information element. Alternatively, indication may be performed through whether an information element exists. For example, existence of a sharing supporting flag information element indicates supporting, inexistence indicates not supporting, and vice versa. This embodiment only defines a function of the indication information, but does not limit a name of the indication information to be sharing supporting flag.

402: According to the indication information, the MSC/VLR stores a location area identity LAI including a first common public land mobile network identifier common PLMN ID.

In an embodiment, the indication information is exactly the first common PLMN ID. The first common PLMN ID is used to indicate that the user equipment does not support network sharing. The MSC/VLR may construct the LAI according to the indicated common PLMN ID.

In another embodiment, the first common PLMN ID is a preset common PLMN ID in the MSC/VLR. The MSC/VLR may generate, according to the preset common PLMN ID, the LAI including the common PLMN ID, and the preset common PLMN ID may be provided by an operator.

In an embodiment, besides including the indication information of the user equipment does not support network sharing, the location update request message may further include an LAI including a circuit switched domain public land mobile network identifier CS domain PLMN ID. Further, the MSC/VLR may store the CS domain PLMN ID, and the MSC/VLR may select the PLMN ID in the LAI as the CS domain PLMN ID, to serve the user equipment. For example, the MSC/VLR serves the user equipment according to a policy of the CS domain PLMN ID, and includes the CS domain PLMN ID in a charging bill.

Figure 5:
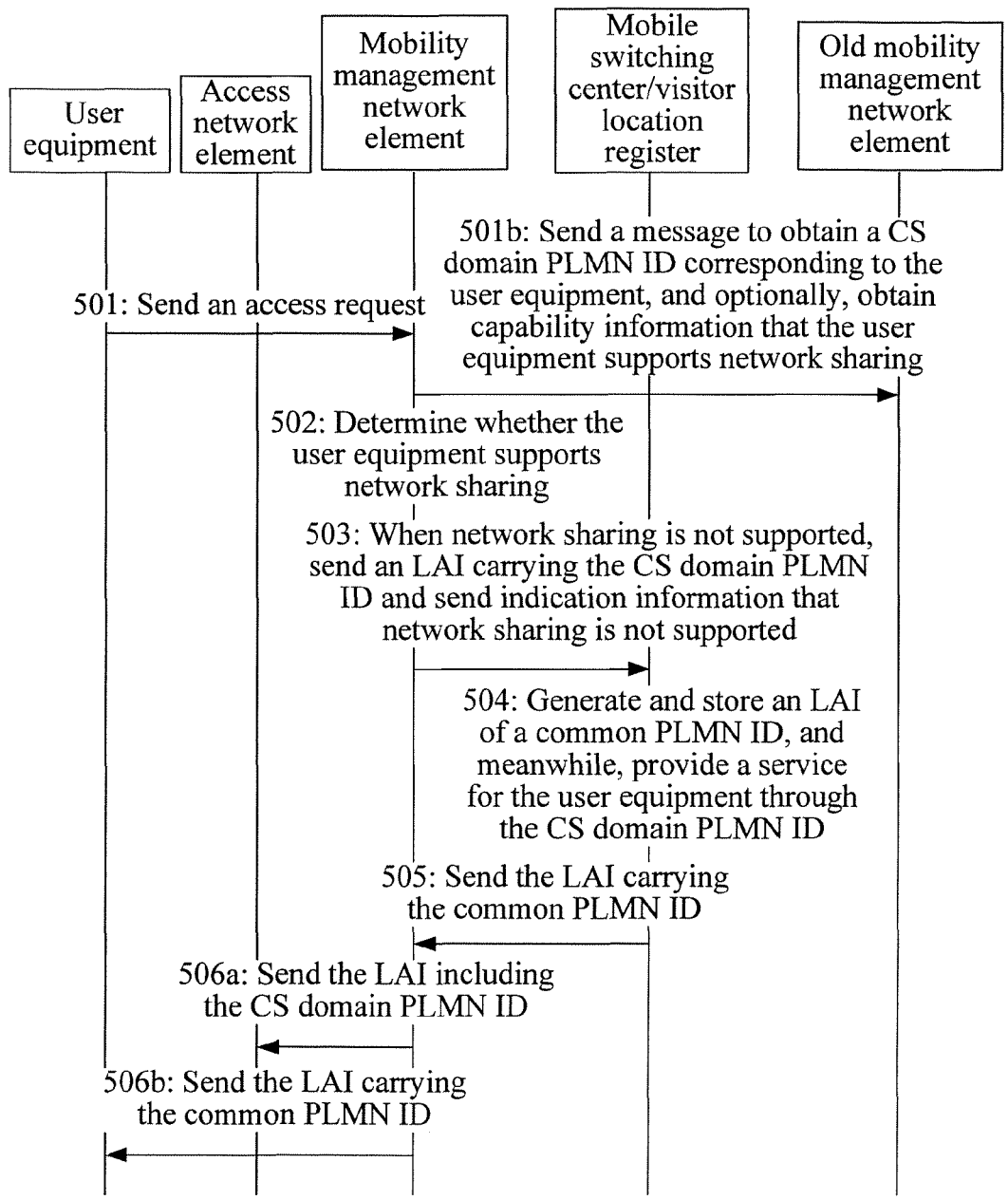
FIG. 5 is a schematic flow chart of still another method for processing network sharing according to an embodiment of the present invention.

For a method for processing network sharing provided by an embodiment of the present invention, a specific application process may, as shown in FIG. 5, include:

501: A user equipment sends an access request to a mobility management network element.

Optionally, 501b: When the mobility management network element needs to select, according to a CS domain PLMN ID of the user equipment located previously, a CS domain PLMN ID currently serving the user equipment, that is, when a user access request is processed, a current mobility management network element sends a message to an old mobility management network element to obtain a CS domain PLMN ID corresponding to the user equipment. Optionally, capability information on whether the user equipment supports network sharing may also be obtained from the old mobility management network element.

502: The mobility management network element determines whether the user equipment supports network sharing.

503: When the user equipment does not support network sharing, the mobility management network element sends a location update request message to a mobile switching center MSC or a visitor location register VLR, where besides including an LAI carrying a CS domain PLMN ID, the location update request message further includes indication information that the user equipment does not support network sharing.

504: The MSC/VLR generates and stores an LAI of a common PLMN ID, and meanwhile, the MSC or the VLR provides a service for the user equipment through the CS domain PLMN ID.

505: The MSC/VLR sends a location update accept message to the mobility management network element, where the location update accept message may include the LAI carrying the common PLMN ID.

506a: The mobility management network element sends the LAI including the CS domain PLMN ID to an access network element corresponding to the user equipment.

506b: The mobility management network element sends an access accept message to the user equipment, where the access accept message may include the LAI carrying the common PLMN ID.

Through the method of this embodiment, when the indication information on whether the user equipment supports network sharing is used to indicate that the user equipment does not support network sharing, the MSC/VLR receives and stores the CS domain PLMN ID sent by the mobility management network element, and meanwhile, constructs the LAI including the common PLMN ID according to the indication information that the user equipment does not support network sharing. The LAI including the common PLMN ID is consistent with the LAI sent by the mobility management network element to the user equipment. A problem caused by LAI inconsistency between the user equipment and the MSC/VLR is solved. Meanwhile, it is still ensured that a correct CS domain PLMN ID is used to serve the user equipment.

Figure 6:
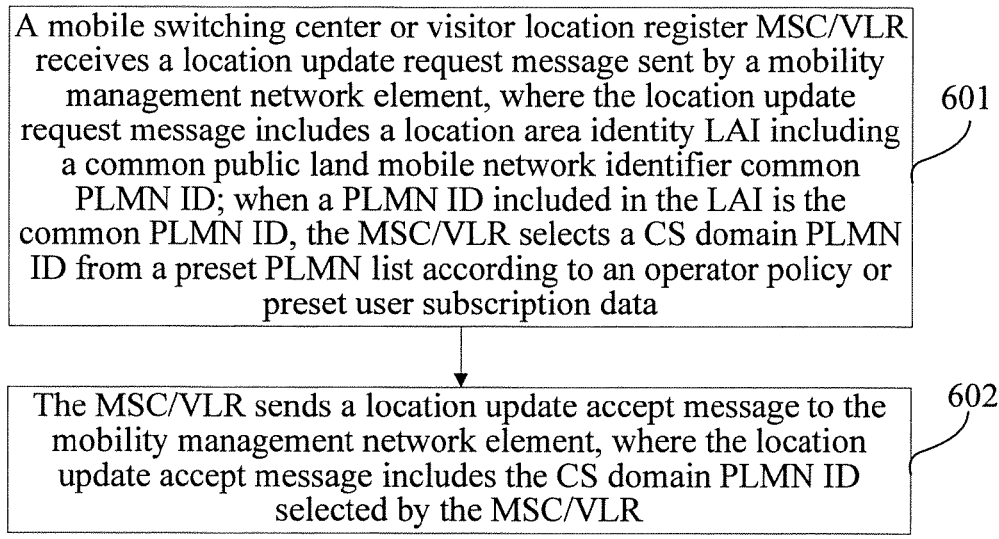
FIG. 6 is a schematic flow chart of yet another method for processing network sharing according to an embodiment of the present invention.

An embodiment provides a method for processing network sharing, and as shown in FIG. 6, the method includes:

601: A mobile switching center or visitor location register MSC/VLR receives a location update request message sent by a mobility management network element, where the location update request message includes a location area identity LAI including a common public land mobile network identifier common PLMN ID.

When a PLMN ID included in the LAI is the common PLMN ID, the MSC/VLR selects a CS domain PLMN ID from a preset PLMN list according to an operator policy or preset user subscription data. The MSC/VLR stores the LAI, and allocates a TMSI according to the LAI.

602: The MSC/VLR sends a location update accept message to the mobility management network element, where the location update accept message includes the CS domain PLMN ID selected by the MSC/VLR.

Through the embodiment of the present invention, after receiving the location area identity LAI including the common public land mobile network identifier common PLMN ID, the MSC/VLR may store the LAI sent by the mobility management network element, and allocate the TMSI according to the LAI. Particularly, when the MSC/VLR determines that the PLMN ID included in the LAI is the common PLMN ID, the CS domain PLMN ID is selected and sent to the mobility management network element. It is ensured that a correct CS domain PLMN ID is used to serve the user equipment. A problem caused by LAI inconsistency between the user equipment and the MSC/VLR is solved.

Figure 7:
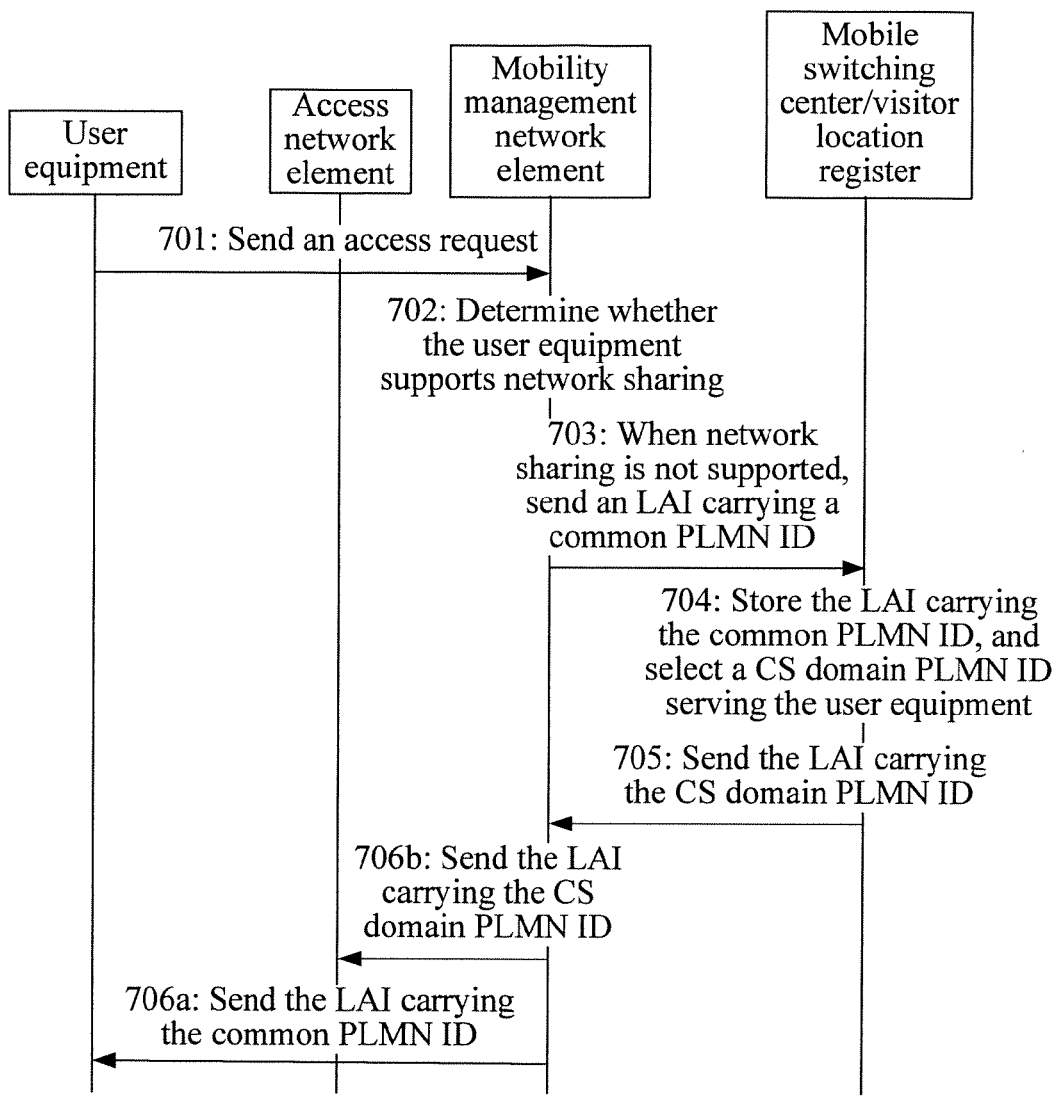
FIG. 7 is a flow chart of a method for processing network sharing according to an embodiment of the present invention.

For a method for processing network sharing provided by an embodiment of the present invention, a specific application process may, as shown in FIG. 7, include:

701: A user equipment sends an access request message to a mobility management network element.

702: The mobility management network element determines whether the user equipment supports network sharing.

703: When the user equipment does not support network sharing, the mobility management network element sends a location update request message to an MSC/VLR, where the location update request message includes an LAI carrying a common PLMN ID.

704: The MSC or the VLR stores the LAI carrying the common PLMN ID, and selects a CS domain PLMN ID serving the user equipment.

705: The MSC or the VLR sends a location update accept message to the mobility management network element, where the message includes the LAI carrying the CS domain PLMN ID.

706a: The mobility management network element sends an access accept message to the user equipment, where the message includes the LAI carrying the common PLMN ID.

706b: The mobility management network element sends the LAI carrying the CS domain PLMN ID to an access network element corresponding to the user equipment.

Figure 8:
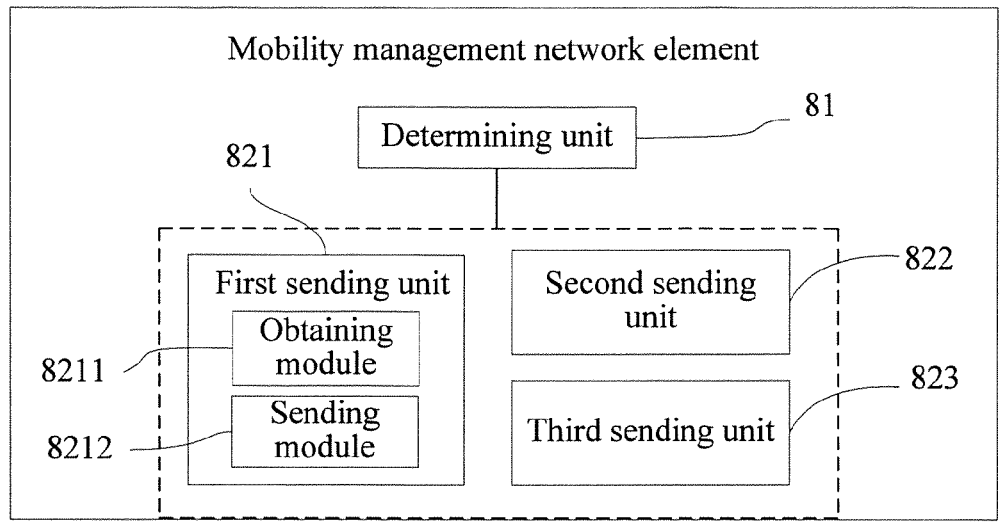
FIG. 8 is a schematic structural diagram of a mobility management network element apparatus according to an embodiment of the present invention.

Corresponding to the part of the method embodiment of the present invention, an embodiment of the present invention provides a mobility management network element apparatus, and as shown in FIG. 8, the apparatus includes: a determining unit 81 and at least one of a first sending unit 821, a second sending unit 822, and a third sending unit 823.

The determining unit 81 may be configured to determine that a user equipment does not support network sharing; and specifically, may be configured to obtain capability indication information indicating whether the user equipment supports network sharing, and determine, according to the capability indication information, that the user equipment does not support network sharing of a target radio access technology RAT preferably selected by circuit service fallback CSFB; and may be further configured to obtain capability indication information indicating whether the user equipment supports network sharing, and determine, according to the capability indication information, that the user equipment does not support network sharing of an RAT preferably selected by a CS domain.

The first sending unit 821 may be configured to send a location update request message to a mobile switching center or visitor location register MSC/VLR, where the location update request message includes the indication information that the user equipment does not support network sharing. For example, the indication information may be a common public land mobile network identifier common PLMN ID. Optionally, the location update request message may further include a selected CS domain PLMN ID.

The second sending unit 822 may be configured to send a location update request message to the mobile switching center or visitor location register MSC/VLR, where the location update request message includes a location area identity LAI including a common public land mobile network identifier common PLMN ID.

The third sending unit 823 may be configured to send a location update request message to the mobile switching center or visitor location register MSC/VLR, where the location update request message includes an LAI including a common PLMN ID and includes a circuit switched domain public land mobile network identifier CS domain PLMN ID.

Specifically, the first sending unit may include:

an obtaining module 8211, configured to obtain the selected CS domain PLMN ID from an old mobility management network element; or, configured to obtain the selected CS domain PLMN ID from a tracking area identifier TAI of the user equipment currently located; or, configured to obtain the selected CS domain PLMN ID from a stored LAI; and a sending module 8212, configured to send, to the MSC/VLR, the location update request message including the indication information and including the selected CS domain PLMN ID obtained by the obtaining module.

For detailed functions or executed actions of units or modules in the apparatus embodiment, reference may be made to the part of the method embodiment of the present invention, and details are not repeatedly described herein.

Figure 9:
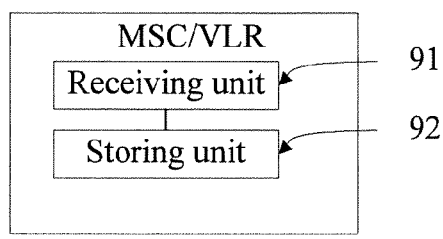
FIG. 9 is a schematic structural diagram of an MSC/VLR apparatus according to an embodiment of the present invention.

Corresponding to the part of the method embodiment of the present invention, an embodiment of the present invention provides a mobile switching center or visitor location register apparatus, which, as shown in FIG. 9, includes:

a receiving unit 91, configured to receive a location update request message sent by a mobility management network element, where the location update request message includes indication information that a user equipment does not support network sharing; and a storing unit 92, configured to store, according to the indication information, a location area identity LAI including a first common public land mobile network identifier common PLMN ID.

For example, the first common PLMN ID may be the indication information, and in this case, the indication information is exactly the common PLMN ID. The first common PLMN ID may also be a preset common PLMN ID in the MSC/VLR.

Optionally, besides including the indication information, the location update request message may further include a circuit switched domain public land mobile network identifier CS domain PLMN ID. The storing unit 92 may be further configured to store the CS domain PLMN ID.

For detailed functions or executed actions of units or modules in the apparatus embodiment, reference may be made to the part of the method embodiment of the present invention, and details are not repeatedly described herein.

Figure 10:
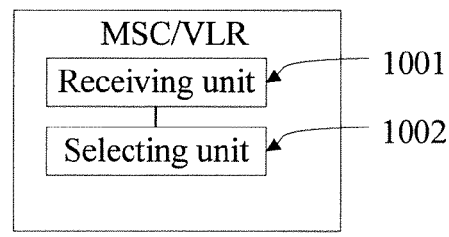
FIG. 10 is a schematic structural diagram of an MSC/VLR apparatus according to an embodiment of the present invention.

Corresponding to the part of the method embodiment of the present invention, an embodiment of the present invention provides a mobile switching center or visitor location register apparatus, which, as shown in FIG. 10, includes:

a receiving unit 1001, configured to receive a location update request message sent by a mobility management network element, where the location update request message includes a first information element, and the first information element is an LAI; and a selecting unit 1002, configured to select a circuit switched domain public land mobile network identifier according to whether the location update request message includes a second information element, where the second information element is a second circuit switched domain public land mobile network identifier; specifically, the selecting unit may be configured to determine that the location update request message includes the second information element, and select a circuit switched domain public land mobile network identifier as the second circuit switched domain public land mobile network identifier, and the first information element includes a common public land mobile network identifier common PLMN ID; or, the selecting unit may be configured to determine that the location update request message does not include the second information element, and select the circuit switched domain public land mobile network identifier which is the same as the first circuit switched domain public land mobile network identifier included in the first information element.

For detailed functions or executed actions of units or modules in the apparatus embodiment, reference may be made to the part of the method embodiment of the present invention, and details are not repeatedly described herein.

Figure 11:
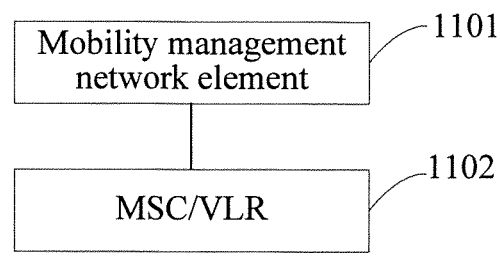
FIG. 11 is a schematic structural diagram of a system for processing network sharing according to an embodiment of the present invention.

Corresponding to the method embodiment and the apparatus embodiment of the present invention, an embodiment of the present invention further provides a system for processing network sharing, which, as shown in FIG. 11, includes a mobility management network element apparatus 1101 provided by the part of the apparatus embodiment and a mobile switching center or visitor location register 1102 provided by the part of the apparatus embodiment.

For functions or executed actions of each network element in the system embodiment, reference may be made to the part of the method embodiment and the part of the apparatus embodiment of the present invention, and details are not repeatedly described herein.

In the method and the apparatus for sharing a core network provided by the embodiments of the present invention, first, a mobility management network element determines that a user equipment does not support network sharing; then, the mobility management network element sends a location update request message to a mobile switching center or visitor location register MSC/VLR, where the location update request message includes indication information that the user equipment does not support network sharing, or the location update request message includes a location area identity LAI including a common public land mobile network identifier common PLMN ID, or the location update request message includes an LAI including a common PLMN ID and includes a circuit switched domain public land mobile network identifier CS domain PLMN ID. In the prior art, when a user equipment not supporting network sharing accesses an MSC/VLR, it is caused that a message sent by the user equipment to the MSC/VLR is inconsistent with an LAI locally stored by the MSC/VLR, and therefore, the MSC/VLR determines to interact with an HSS again to obtain user data, and may perform re-authorization and authentication on the user equipment, which increases a time delay, and meanwhile, incurs unnecessary signaling, thereby causing a great waste of network resources. In the method and the apparatus provided by the embodiments of the present invention, it is implemented that a user equipment normally accesses an MSC/VLR, and meanwhile, a problem that when the user equipment accesses a network, an LAI sent by the user equipment to the MSC/VLR is inconsistent with an LAI locally stored by the MSC/VLR, and therefore, the MSC/VLR performs re-authorization on the user equipment, which increases a time delay, and meanwhile, incurs unnecessary signaling, thereby causing a great waste of network resources is solved.

The apparatus for sharing a core network provided by the embodiment of the present invention may implement the foregoing provided method embodiment, and for detailed implementation of functions, reference may be made to description in the method embodiment, and details are not repeatedly described herein. The method and the apparatus for sharing a core network provided by the embodiments of the present invention may be applicable to the field of communications systems, but are not limited thereto.

Persons of ordinary skill in the art should understand that, all or a part of processes in the method in the foregoing embodiments may be accomplished by a computer program instructing relevant hardware. The program may be stored in a computer-readable storage medium. When the program is executed, the processes of the foregoing method embodiments are performed. The storage medium may be a magnetic disk, an optical disk, a read-only memory (Read-Only Memory, ROM), a random access memory (Random Access Memory, RAM), and the like.

The foregoing descriptions are merely specific implementation manners of the present invention, but are not intended to limit the protection scope of the present invention. Variations or replacements readily apparent to persons skilled in the prior art within the technical scope disclosed in the present invention shall fall within the protection scope of the present invention. Therefore, the protection scope of the present invention is subject to the protection scope of the claims.

What is claimed is:

1. A method for processing network sharing, the method comprising:
   receiving, by a mobility management network element, an access request sent by a user equipment;
   determining, by the mobility management network element, whether the user equipment supports network sharing;
   selecting, by the mobility management network element, a circuit switched domain public land mobile network identifier (CS domain PLMN ID) to provide a service for the user equipment, wherein selecting, by the mobility management network element, the CS domain PLMN ID comprises:
      sending, by the mobility management network element, a message to a prior mobility management element of the user equipment to obtain the CS domain PLMN ID;
   when the user equipment does not support network sharing, sending, by the mobility management network element, a location update request message to a mobile switching center or visitor location register (MSC/VLR), wherein the location update request message comprises:
      a location area identity (LAI) comprising a common public land mobile network identifier (PLMN ID), and
      the CS domain PLMN ID selected by the mobility management network element; and
   sending, by the mobility management network element, an access accept message to the user equipment, wherein the access accept message includes the LAI comprising the common PLMN ID to be used by the user equipment for accessing the MSC/VLR.

2. The method according to claim 1, wherein determining, by the mobility management network element, whether the user equipment supports network sharing comprises:
   obtaining, by the mobility management network element, capability information indicating whether the user equipment supports network sharing; and
   according to the capability information, determining, by the mobility management network element, whether the user equipment supports network sharing of a target radio access technology (RAT).

3. The method according to claim 2, wherein determining, by the mobility management network element, whether the user equipment supports network sharing of the target RAT comprises:
   determining, by the mobility management network element, whether the user equipment supports network sharing of a GSM EDGE radio access network (GERAN), wherein the target RAT is the GERAN, and the GERAN network supports network sharing; or
   determining, by the mobility management network element, whether the user equipment supports network sharing of a universal mobile telecommunications system terrestrial radio access network (UTRAN), wherein the target RAT is the UTRAN, and the UTRAN network supports network sharing.

4. The method according to claim 1, wherein determining, by the mobility management network element, whether the user equipment supports network sharing comprises:
   obtaining, by the mobility management network element, capability information indicating whether the user equipment supports network sharing; and
   according to the capability information, determining, by the mobility management network element, whether the user equipment supports network sharing of a target radio access technology (RAT).

5. The method according to claim 4, wherein determining, by the mobility management network element, whether the user equipment supports network sharing of the RAT comprises:
   determining, by the mobility management network element, whether the user equipment supports network sharing of a GSM EDGE radio access network (GERAN), wherein the RAT is the GERAN, and the GERAN network supports network sharing; or
   determining, by the mobility management network element, whether the user equipment supports network sharing of a universal mobile telecommunications system terrestrial radio access network (UTRAN), wherein the RAT is the UTRAN, and the UTRAN network supports network sharing.

6. A mobility management network element apparatus, comprising:
   a processor;
   a transmitter;
   wherein the processor is configured to determine whether a user equipment supports network sharing in response to the apparatus receiving an access request message from the user equipment; and
   the transmitter is configured to:
      select a circuit switched domain public land mobile network identifier (CS domain PLMN ID) to provide a service for the user equipment, wherein the CS domain PLMN ID is obtained from a prior mobility management network element of the user equipment;
      when the user equipment does not support network sharing, send a location update request message to a mobile switching center or visitor location register MSC/VLR, wherein the location update request message comprises a location area identity (LAI) including a common public land mobile network identifier (PLMN ID) and comprises the selected CS domain PLMN ID, and
      send an access accept message to the user equipment, wherein the access accept message includes the LAI comprising the common PLMN ID to be used by the user equipment for accessing the MSC/VLR.

7. The apparatus according to claim 6, wherein the processor is configured to obtain capability information indicating whether the user equipment supports network sharing, and determine, according to the capability information, whether the user equipment supports network sharing of a target radio access technology (RAT).

8. The apparatus according to claim 7, wherein the processor is configured to:
   determine whether the user equipment supports network sharing of a GSM EDGE radio access network (GERAN), wherein the target RAT is the GERAN, and the GERAN network supports network sharing; or
   determine whether the user equipment supports network sharing of a universal mobile telecommunications system terrestrial radio access network (UTRAN), wherein the target RAT is the UTRAN, and the UTRAN network supports network sharing.

9. A non-transitory computer readable medium, which stores program code for execution by an apparatus in a communication system, wherein the program code comprises instructions for performing a method for processing network sharing, and wherein the method comprises:
   receiving an access request sent by a user equipment;
   determining whether the user equipment supports network sharing;
   selecting a circuit switched domain public land mobile network identifier (CS domain PLMN ID) to provide a service for the user equipment, wherein the CS domain PLMN ID is obtained from a prior mobility management element of the user equipment;
   when the user equipment does not support network sharing, sending a location update request message to a mobile switching center or visitor location register (MSC/VLR), wherein the location update request message comprises:
      a location area identity (LAI) comprising a common public land mobile network identifier (PLMN ID); and
      the CS domain PLMN ID selected by the apparatus.

10. The non-transitory computer readable medium according to claim 9, wherein determining whether the user equipment supports network sharing comprises:
    obtaining capability information indicating whether the user equipment supports network sharing; and
    according to the capability information, determining whether the user equipment supports network sharing of a target radio access technology (RAT).

11. The non-transitory computer readable medium according to claim 9, wherein determining whether the user equipment supports network sharing comprises:
    obtaining capability information indicating whether the user equipment supports network sharing; and
    according to the capability information, determining whether the user equipment supports network sharing of a target radio access technology (RAT).

12. The non-transitory computer readable medium according to claim 10, wherein determining whether the user equipment supports network sharing of the target RAT comprises:
    determining whether the user equipment supports network sharing of a GSM EDGE radio access network (GERAN), wherein the target RAT is the GERAN, and the GERAN network supports network sharing; or
    determining whether the user equipment supports network sharing of a universal mobile telecommunications system terrestrial radio access network (UTRAN), wherein the target RAT is the UTRAN, and the UTRAN network supports network sharing.

13. The non-transitory computer readable medium according to claim 11, wherein determining whether the user equipment supports network sharing of the target RAT comprises:
    determining whether the user equipment supports network sharing of a GSM EDGE radio access network (GERAN), wherein the RAT is the GERAN, and the GERAN network supports network sharing; or
    determining whether the user equipment supports network sharing of a universal mobile telecommunications system terrestrial radio access network (UTRAN), wherein the RAT is the UTRAN, and the UTRAN network supports network sharing.

14. A communication system, comprising a mobility management network element and a mobile switching center or visitor location register (MSC/VLR), wherein:
    the mobility management network element is configured to:
       receive an access request from a user equipment,
       determine whether the user equipment supports network sharing, select a circuit switched domain public land mobile network identifier (CS domain PLMN ID) to provide a service for the user equipment, send a message to a prior mobility management element of the user equipment to obtain the CS domain PLMN ID, when the user equipment does not support network sharing, send a location update request message to the MSC/VLR, wherein the location update request message comprises a location area identity (LAI) including a common public land mobile network identifier (PLMN ID) and comprises the selected CS domain PLMN ID, and send an access accept message to the user equipment, wherein the access accept message includes the LAI comprising the common PLMN ID to be used by the user equipment for accessing the MSC/VLR; and the MSC/VLR is configured to:

receive the location update request message from the mobility management network element, and select a circuit switched domain public land mobile network identifier which is the same as the circuit switched domain public land mobile network identifier included in the location update request message.

15. The system according to claim 14, wherein the mobility management network element is further configured to:

obtain capability information indicating whether the user equipment supports network sharing; and according to the capability information, determine whether the user equipment supports network sharing of a target radio access technology (RAT).

* * * * *